(No Model.)
J. T. DILLEHAY.
VEHICLE BRAKE.
No. 290,868. Patented Dec. 25, 1883.
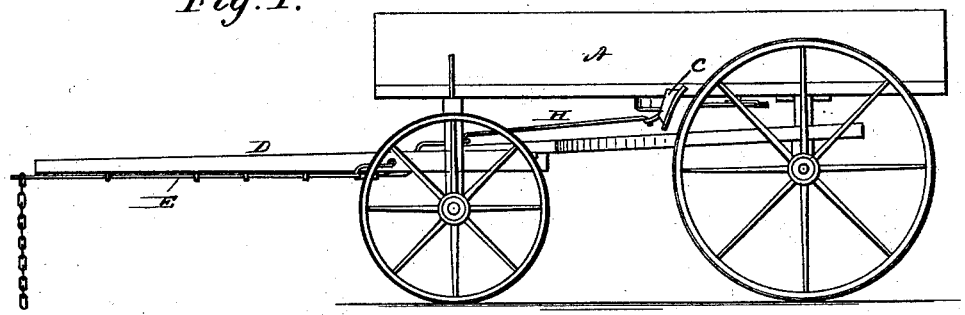
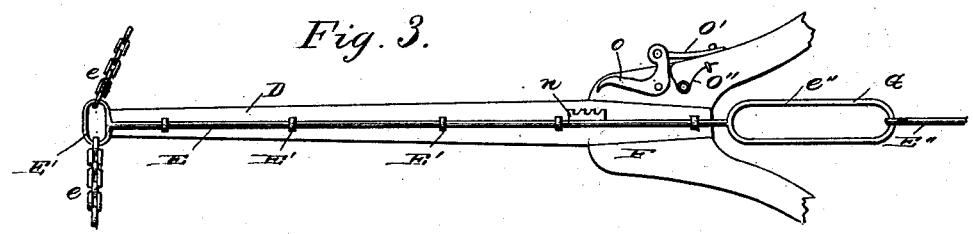
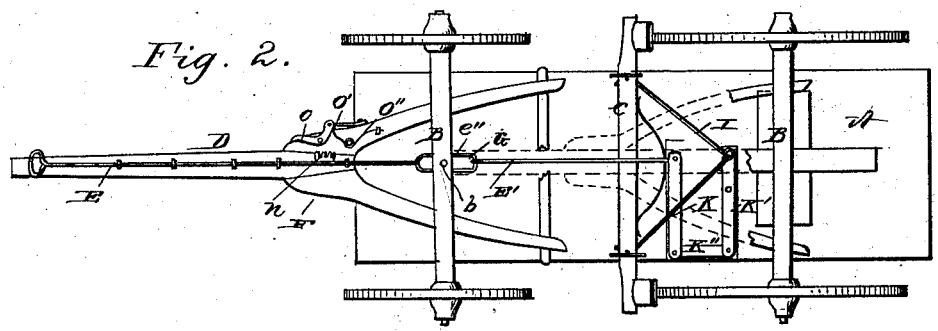
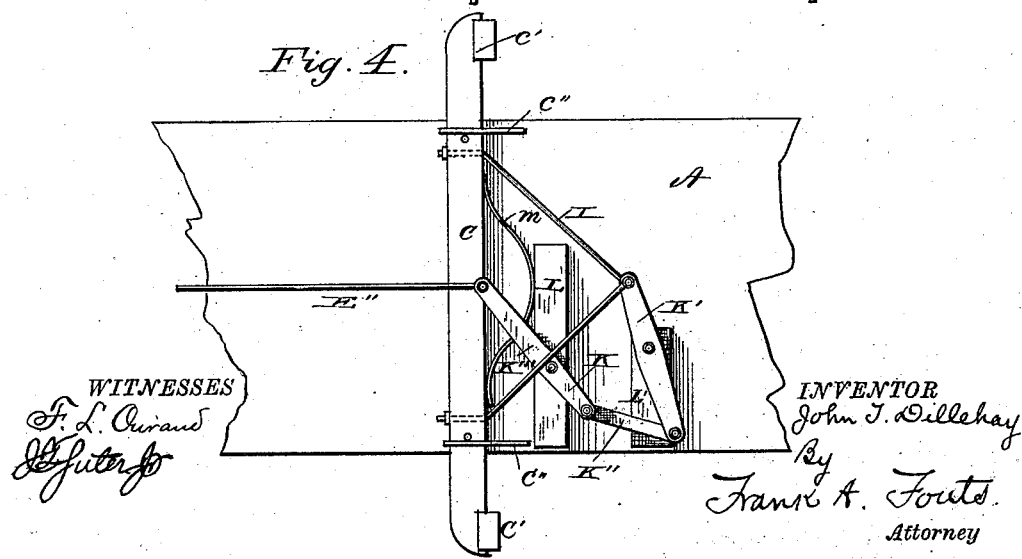
WITNESSES
INVENTOR
John T. Dillehay
By Frank A. Fouts
Attorney

United States Patent Office.

JOHN T. DILLEHAY, OF BEECH GROVE, KENTUCKY.

VEHICLE-BRAKE.

SPECIFICATION forming part of Letters Patent No. 290,838, dated December 25, 1883.

Application filed October 29, 1883. (No model.)

*To all whom it may concern:*

Be it known that I, JOHN T. DILLEHAY, a citizen of the United States, residing at Beech Grove, in the county of McLean and State of Kentucky, have invented certain new and useful Improvements in Vehicle-Brakes, of which the following is a specification, reference being had therein to the accompanying drawings.

My invention relates to improvements in automatic vehicle-brakes; and it consists in the novel arrangement and combination of parts, as will be hereinafter fully described, and specifically set forth in the claims. I attain these objects by the mechanism illustrated in the accompanying drawings, in which—

Figure 1 represents a longitudinal view of a vehicle having my automatic brake attached; Fig. 2, an inverted plan view of the same, and Figs. 3 and 4 enlarged views in detail.

Similar letters refer to similar parts throughout the several views.

A represents the body of an ordinary vehicle, mounted upon the axles and wheels B B.

Suitably attached to the front of the vehicle is an ordinary tongue, D, to the under side of which is loosely secured a rod, E, made of any suitable material—such, for instance, as steel, cast or wrought iron, and the like—and which is adapted to have a sliding movement both backward and forward through the staples E'. The front of the rod E terminates in a loop, to which are secured the ordinary straps or chains connected to the collars of the harness. The rod, when it reaches the forward axle, terminates in an oblong loop, e'', through which the pin or bolt b', connecting the axle to the body of the vehicle, is allowed to pass, said loop being bent at right angles and over the axle, as shown. The end of the loop e'' is connected by a rod, E'', to the double toggle-joint K, consisting of the pivoted arms K''' K'' K', which are in turn pivoted to suitable projecting pieces, L L', secured to the under side of the body A.

To the arm K' of the toggle K is pivoted at its end an angle-bar, I, screw-threaded at its ends, by which means it is firmly secured to the cross-bar C, carrying the brake-shoes C' C' upon each of its outer ends, and which is adapted to have a longitudinal play in the loops or staples C'', secured to the body of the vehicle.

To the forward and under side of the forked projecting piece F is secured a pawl, O, held in the position shown in Fig. 3 by a pivoted hook, O', adapted to engage with a perforation, O''. The rod E has secured to or formed with it a short horizontal rack-bar, h, the object of which will be hereinafter more fully described.

On the cross-bar C, and in rear thereof, is adjustably secured a spring, m, which has a bearing on the short bar L', the purpose of which is to normally keep the brake-shoes C' on the cross-bar C away or from contact with the periphery of the rear wheels.

I will now proceed to describe the operation. The several parts being in the position shown in Fig. 2, as the vehicle is about to descend an incline, and the rod E suitably attached to the draft-animals, it will cause said rod to be forced backward, and at the same time cause the arm K''' of the toggle-joint to be pushed backward, bringing forward the arm K'' and throwing back the end of the arm K', which at the same time will draw upon the rods I, connected to the cross-bar C, thereby effectually locking the wheels, and as the descent to be made be of a greater or less inclination, so will the force exerted upon the rods and brake-shoes be correspondingly greater or less. The end of the incline being reached and the power exerted upon the rod being withdrawn, the spring m will tend to release the brake and throw it away from engagement with the periphery of the wheels.

To back the wagon for any purpose, the hook O' will be withdrawn from the pawl O, which will, by means of the spring O'', come in contact and engagement with the rack-bar h, thus locking the rod and thereby preventing it from having a backward movement.

I have here shown my device adapted for use on a double-team vehicle; but I may also effectually employ it to a single-team conveyance by simply providing rods E on each side parallel with the shafts, and then connecting them together in the rear in any suitable manner to the toggle-joint and cross-bar above described.

Having thus fully described my invention, what I claim, and desire to secure by Letters Patent, is—

1. In an automatic vehicle-brake, the sliding rod E, connected to a toggle-joint, having suitably secured thereto the cross-bar C, provided with brake-shoes and kept normally in an open position by the spring $m$, substantially as described, and for the purposes set forth.

2. In an automatic vehicle-brake, the sliding rod E, rack-bar $h$, and oblong loop $e''$, the connecting-rod H, pivoted to the toggle-joint K, consisting of the pivoted arms K''' K'' K', connected by diagonal screw-threaded rods to the sliding cross-bar C, having brake-shoes C' C', spring $m$, adapted to hold the cross-bar in an open position, and the pawl O, hook O', and spring O'', whereby the pawl is adapted, when disengaged, to lock the rod E, all substantially as set forth, and for the purpose described.

In testimony whereof I affix my signature in presence of two witnesses.

JNO. T. DILLEHAY.

Witnesses:
MORTON WATKINS,
E. G. ADAMS.